US009832552B2

(12) United States Patent
Lee et al.

(10) Patent No.: US 9,832,552 B2
(45) Date of Patent: Nov. 28, 2017

(54) LOCKING A POLARIZATION-INSENSITIVE OPTICAL RECEIVER

(71) Applicant: Oracle International Corporation, Redwood Shores, CA (US)

(72) Inventors: Daniel Y. Lee, San Diego, CA (US); Xuezhe Zheng, San Diego, CA (US); Ashok V. Krishnamoorthy, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/013,857

(22) Filed: Feb. 2, 2016

(65) Prior Publication Data

US 2017/0223437 A1 Aug. 3, 2017

(51) Int. Cl.
| | |
|---|---|
| *G02F 1/035* | (2006.01) |
| *G02B 6/12* | (2006.01) |
| *G02B 6/28* | (2006.01) |
| *G02B 6/42* | (2006.01) |
| *G02B 6/34* | (2006.01) |
| *H04B 10/06* | (2006.01) |
| *H04Q 11/00* | (2006.01) |

(Continued)

(52) U.S. Cl.
CPC ...... *H04Q 11/0005* (2013.01); *H04J 14/0212* (2013.01); *H04J 14/06* (2013.01); *H04Q 2011/0009* (2013.01); *H04Q 2011/0016* (2013.01)

(58) Field of Classification Search
USPC ............. 385/37, 24, 2, 14, 31; 398/214, 202
See application file for complete search history.

(56) References Cited

U.S. PATENT DOCUMENTS

| | | | | |
|---|---|---|---|---|
| 5,809,184 | A | * 9/1998 | Doerr ................. | G02B 6/12016 385/11 |
| 6,061,481 | A | * 5/2000 | Heidrich .............. | G02B 6/4246 385/14 |

(Continued)

OTHER PUBLICATIONS

Dirk Taillaert, A Compact Two-Dimensional Grating Coupler Used as a Polarization Splitter, Sep. 9, 2003, IEEE Photonics Technology, vol. 15.*

(Continued)

*Primary Examiner* — David Payne
*Assistant Examiner* — Pranesh Barua
(74) *Attorney, Agent, or Firm* — Park, Vaughan, Fleming & Dowler LLP

(57) ABSTRACT

An optical receiver is described. Using silicon-photonic components that support a single polarization, the output of an optical receiver is independent of the polarization of an optical signal. In particular, using a polarization-diversity technique, the two orthogonal polarizations in a single-mode optical fiber are split in two and processed independently. For example, the two optical signals may be provided by a polarization-splitting grating coupler. Subsequently, a redistribution element provides mixtures of the two optical signals. Next, a wavelength channel in the two mixed optical signals is selected using a wavelength-selective filter (for example, using ring-resonator drop filters or an echelle grating) and converted into an electrical signal at an optical detector (such as a photodetector) to achieve polarization-independent operation.

18 Claims, 8 Drawing Sheets

(51) Int. Cl.
*H04J 14/06* (2006.01)
*H04J 14/02* (2006.01)

(56) References Cited

U.S. PATENT DOCUMENTS

| | | | | |
|---|---|---|---|---|
| 6,571,038 | B1* | 5/2003 | Joyner | G02B 6/2813 385/27 |
| 6,580,844 | B2* | 6/2003 | Leuthold | G02B 6/12007 385/15 |
| 8,532,446 | B2* | 9/2013 | Zheng | G02B 6/12007 385/24 |
| 9,285,539 | B2 | 3/2016 | Zheng et al. | |
| 2002/0015561 | A1* | 2/2002 | Kawashima | G02B 6/125 385/42 |
| 2004/0096151 | A1* | 5/2004 | Svilans | G01J 3/12 385/27 |
| 2004/0165807 | A1* | 8/2004 | Liu | G02F 1/2257 385/3 |
| 2005/0018965 | A1* | 1/2005 | Shen | G02B 6/12019 385/37 |
| 2010/0329679 | A1* | 12/2010 | Little | H04J 14/02 398/79 |
| 2011/0064422 | A1* | 3/2011 | Kim | G02B 6/12004 398/214 |
| 2011/0310917 | A1* | 12/2011 | Krishnamoorthy | H01S 5/06821 372/23 |
| 2012/0002921 | A1* | 1/2012 | Jeong | G02B 6/125 385/32 |
| 2012/0189025 | A1* | 7/2012 | Zheng | H01S 5/1071 372/20 |
| 2012/0237155 | A1* | 9/2012 | Zheng | G02B 6/12007 385/2 |
| 2013/0136389 | A1* | 5/2013 | Luo | G02B 6/12007 385/11 |
| 2013/0188971 | A1* | 7/2013 | Painchaud | H04B 10/612 398/214 |
| 2014/0169737 | A1* | 6/2014 | Zheng | G02B 6/12007 385/37 |
| 2014/0270784 | A1* | 9/2014 | Thacker | G02B 6/4284 398/115 |
| 2015/0049984 | A1* | 2/2015 | Kato | G02F 1/225 385/31 |
| 2015/0260914 | A1* | 9/2015 | Zheng | G02B 6/126 385/11 |

OTHER PUBLICATIONS

Zheng et al.; "Ultra-Low Power Arrayed CMOS Silicon Photonic Transceivers for an 80 Gbps WDM Optical Link," IEEE JLT, 30(4) 641-650 (2012).

Krishnamoorthy et al.; "Progress in low-power switched optical interconnects," IEEE Journal of Selected Topics in Quantum Electronics, vol. 17, No. 2, Mar. 2011.

Taillaert et al.; "Compact efficient broadband grating coupler for siliconon-insulator waveguides," Opt. Lett., 29(23) 2749-2751 (2004).

Backlund et al.; "Input waveguide grating couplers designed for a desired wavelength and polarization response," Appl. Opt., 41(15) 2818-2825 (2002).

Wang et al.; "Experimental Demonstration of a High Efficiency Polarization Splitter Based on a One-Dimensional Grating With a Bragg Reflector Underneath," IEEE PTL, 22(21) 1568-1570 (2010).

Taillaert et al.; "A Compact Two-Dimensional Grating Coupler Used as a Polarization Splitter," IEEE PTL, 15(9) 1249-1251 (2003).

Little et al.; "Microring resonator channel dropping filters," J. Light. Technol., vol. 15, No. 6, pp. 998-1005, Jun. 1997.

Padmaraju et al.; "Wavelength Locking and Thermally Stabilizing Microring Resonators Using Dithering Signals," J. Light. Technol., vol. 32, No. 3, pp. 505-512, Feb. 2014.

Zheng et al.; "A high-speed, tunable silicon photonic ring modulator integrated with ultra-efficient active wavelength control.," Opt. Express, vol. 22, No. 10, pp. 12628-12633, May 2014.

Asghari et al.; "Energy-Efficient Communication" Nature Photonics, vol. 5, May 2011, www.nature.com/naturephotonics.

* cited by examiner

LOCKING A POLARIZATION-INSENSITIVE OPTICAL RECEIVER

GOVERNMENT LICENSE RIGHTS

This invention was made with United States government support under Agreement No. HR0011-08-9-0001 awarded by DARPA. The United States government has certain rights in the invention.

BACKGROUND

Field

The present disclosure generally relates to a technique for locking an optical receiver to its received wavelength. More specifically, the present disclosure relates to a technique for locking an optical receiver that is insensitive to the polarization of an optical signal.

Related Art

Optical interconnects or links based on silicon photonics have the potential to alleviate inter-chip communication bottlenecks in high-performance computing systems that include multiple processor chips and memory chips. This is because, relative to electrical interconnects, optical interconnects offer significantly improved: bandwidth, density, power consumption, size, latency, and range. As a consequence, researchers are investigating optical interconnects based on wavelength division multiplexing (WDM) for use in computing systems.

In many computing systems, relatively long interconnects are often needed, such as the interconnects between: processors, processors and memory, processing nodes, and racks. Typically, optical fiber is used for these long interconnects. FIG. 1 provides a block diagram of an existing optical system, with an optical fiber coupling a transmitter chip and a receiver chip. In the transmitter chip, WDM wavelength channels are modulated and multiplexed into an optical waveguide. Then, an optical signal that includes the multiplexed WDM wavelength channels is coupled into a transport optical fiber via an optical waveguide-to-optical fiber coupler. Moreover, at the receiver chip, the WDM optical signals are coupled back to a silicon optical waveguide on the receiver chip. Next, a wavelength de-multiplexer separates the wavelength channels into different receiver channels.

Because of the high contrast in the index of refraction and wavelength-scale dimensions, silicon optical waveguides on thin silicon-on-insulator are inherently polarization-dependent. While it is possible to create silicon-on-insulator (SOI) optical waveguides that guide both polarizations with low loss (such as ~0.1 dB/cm) for sub-micron optical waveguides, typically, only the transverse-electric (TE) mode is propagated in the optical waveguide with low loss, while the transverse-magnetic (TM) mode is highly attenuated. Additionally, there is usually birefringence associated with the two different polarizations, which can cause the orthogonal polarizations to experience different indexes of refraction. Moreover, because most of the viable SOI modulators use sub-micron optical waveguides (e.g., a Mach-Zehnder modulator and resonant ring modulators), such silicon photonic circuits usually only provide functionality for a single polarization. Furthermore, because the polarization of light is an unknown and changing quantity in most optical fibers, this can pose a serious problem for silicon photonic WDM optical interconnects over optical fibers, especially at the receiver chip, which must deal with a varying and unknown state-of-polarization of the incoming optical signal.

As shown in FIG. 1, with an optical waveguide-to-optical fiber coupler, silicon-on-insulator optical waveguides, and a wavelength de-multiplexer supporting single polarization, the magnitude of the received optical signal will vary depending upon the polarization state of light in the optical fiber. The polarization dependence results in intensity noise that can degrade the performance, and thus the reliability of such a silicon-photonic WDM optical interconnect over an optical fiber.

One technique for addressing this problem is to use a polarization-maintaining (PM) optical fiber to control the polarization of light transmission to the receiver chip. However, this approach is often expensive and difficult to implement. In particular, PM optical fibers are usually much more expensive and far less readily available than regular single-mode optical fibers (SMFs). Furthermore, the PM optical fiber may need to be keyed at every coupling point to maintain its radial alignment.

Alternatively, the problem can be addressed by using a multimode optical fiber as a natural polarization scrambler. However, while this approach reduces the polarization sensitivity of the receiver chip that supports single polarization, it also introduces significant optical loss when coupling multimode WDM optical signals into silicon-on-insulator optical waveguides and can severely limit the range.

Hence, what is needed is an optical receiver that does not suffer from the above-described problems.

SUMMARY

One embodiment of the present disclosure provides an optical receiver that includes a polarization-splitting grating coupler (PSGC) having an input port, a first output port and a second output port. The input port receives an input optical signal having two orthogonal polarization components and multiple wavelengths, the first output port provides a first optical signal having a type of transverse mode (such as a transverse-electric (TE) mode or a transverse-magnetic (TM) mode) corresponding to one of the two polarization components, and the second output port provides a second optical signal having the type of transverse mode corresponding to the other of the two incident polarization components. Moreover, the optical receiver includes a redistribution element, optically coupled to the first output port and the second output port, having a third output port and a fourth output port, where the third output port and the fourth output ports provide mixtures of the first optical signal and the second optical signal.

Furthermore, the optical receiver includes: a first optical waveguide optically coupled to the third output port; a second optical waveguide optically coupled to the fourth output port; and a wavelength-selective filter optically coupled to the first optical waveguide and the second optical waveguide. The wavelength-selective filter has output ports that provide output optical signals having the wavelengths in the first optical signal and the second optical signal, where a given output port provides a given output optical signal having a given wavelength in the first optical signal and the second optical signal. Furthermore, the optical receiver includes optical detectors, optically coupled to the wavelength-selective filter, that provide electrical signals corresponding to the output optical signals, where a given optical detector is optically coupled to at least the given output port and provides a given electrical signal corresponding to at least the given output optical signal.

Note that the PSGC may project the two orthogonal polarization components into the first optical signal on a first output port having the type of transverse mode and the second optical signal on a second (orthogonal) output port having a second type of transverse mode. For example, the type of transverse mode may be a TE mode and the second type of transverse mode may be another TE mode.

Moreover, the redistribution element may include: a directional coupler and/or a multi-mode interferometer.

Furthermore, the wavelength-selective filter may include pairs of ring-resonator drop filters optically coupled to the first optical waveguide and the second optical waveguide, and optically coupled to the optical detectors. A first ring-resonator drop filter in a given pair of ring-resonator drop filters may include one of the output ports and may output a first output optical signal having a first wavelength in the first optical signal and the second optical signal. Moreover, a second ring-resonator drop filter in the given pair of ring-resonator drop filters may include another of the output ports and may output a second output optical signal having the first wavelength in the first optical signal and the second optical signal. Furthermore, the given optical detector may be optically coupled to the first ring-resonator drop filter and the second ring-resonator drop filter.

Additionally, the wavelength-selective filter may include: input ports that couple to the first optical waveguide and the second optical waveguide; a propagation region that conveys the first optical signal and the second optical signal; an optical device that images and diffracts the first optical signal and the second optical signal using a reflective geometry; and the output ports, optically coupled to diffraction orders of the optical device, which provide the output optical signals having the wavelengths in the first optical signal and the second optical signal. Note that an incidence angle associated with a given diffraction order of the optical device may be different than a diffraction angle associated with the given diffraction order. Moreover, the optical device may include a diffraction grating on a curved surface. For example, the optical device may include an echelle grating.

In some embodiments, the optical receiver includes: a substrate; a buried-oxide layer disposed on the substrate; and a semiconductor layer disposed on the buried-oxide layer, where the first optical waveguide and the second optical waveguide are included in the semiconductor layer. For example, the substrate may include a semiconductor. Furthermore, the wavelength-selective filter may be included in the semiconductor layer.

Moreover, the wavelength-selective filter may include: first pairs of ring-resonator drop filters optically coupled to the first optical waveguide and the optical detectors; and second pairs of ring-resonator drop filters optically coupled to the optical detectors, and the second optical waveguide; and control logic. The control logic may lock a given first pair of ring-resonator drop filters to a first wavelength on the first optical waveguide and a given second pair of ring-resonator drop filters to a second wavelength on the second optical waveguide by: applying a dithering electrical signal to a thermal-tuning mechanism that is thermally coupled to a given pair of ring-resonator drop filters in the given first pair of ring-resonator drop filters and the given second pair of ring-resonator drop filters in order to thermally modulate the resonance wavelengths of each of the ring-resonator drop filters in the given pair so as to create a dithered (and, more generally, a modulated) optical signal associated with each of the ring-resonator drop filters in the give pair that is detected and used to lock the given pair to its corresponding wavelength. For example, the control logic may: measure or detect the dithered optical signal (e.g., using a separate monitor optical detector that is associated with the given pair or at least one of the ring-resonator drop filters in the given pair); use the measurements to produce an error signal (which is independent of other error signals in the optical receiver); and may adjust the dithered electrical signal (i.e., a power) applied to the thermal-tuning mechanism. Note that the control logic may, simultaneously and independently, perform these operations with the other given pair of ring-resonator drop filters in the first pair ring-resonator drop filters and the second pair of ring-resonator drop filters to lock it to its corresponding wavelength (which may be the same or different than the locked wavelength of the first pair of ring-resonator drop filters).

Furthermore, the wavelength-selective filter may include pairs of ring-resonator drop filters optically coupled to the first optical waveguide and the second optical waveguide, and optically coupled to the optical detectors. Additionally, the optical receiver may include control logic that locks a given pair of ring-resonator drop filters by: determining a polarity of the error signal by comparing a given electrical signal output by a given optical detector with a threshold value; and reversing, based on a sign of the error signal, a sign of an amount of an increment that is applied to the thermal-tuning mechanism that is thermally coupled to the given pair of ring-resonator drop filters. Note that the threshold value may be modified after a time interval.

In some embodiments, one or more of the optical detectors are shared by different output ports in the wavelength-selective filter using time-division multiplexing.

Another embodiment provides a system that includes the optical receiver.

Another embodiment provides a method for providing the output optical signals, which may be performed by the optical receiver.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
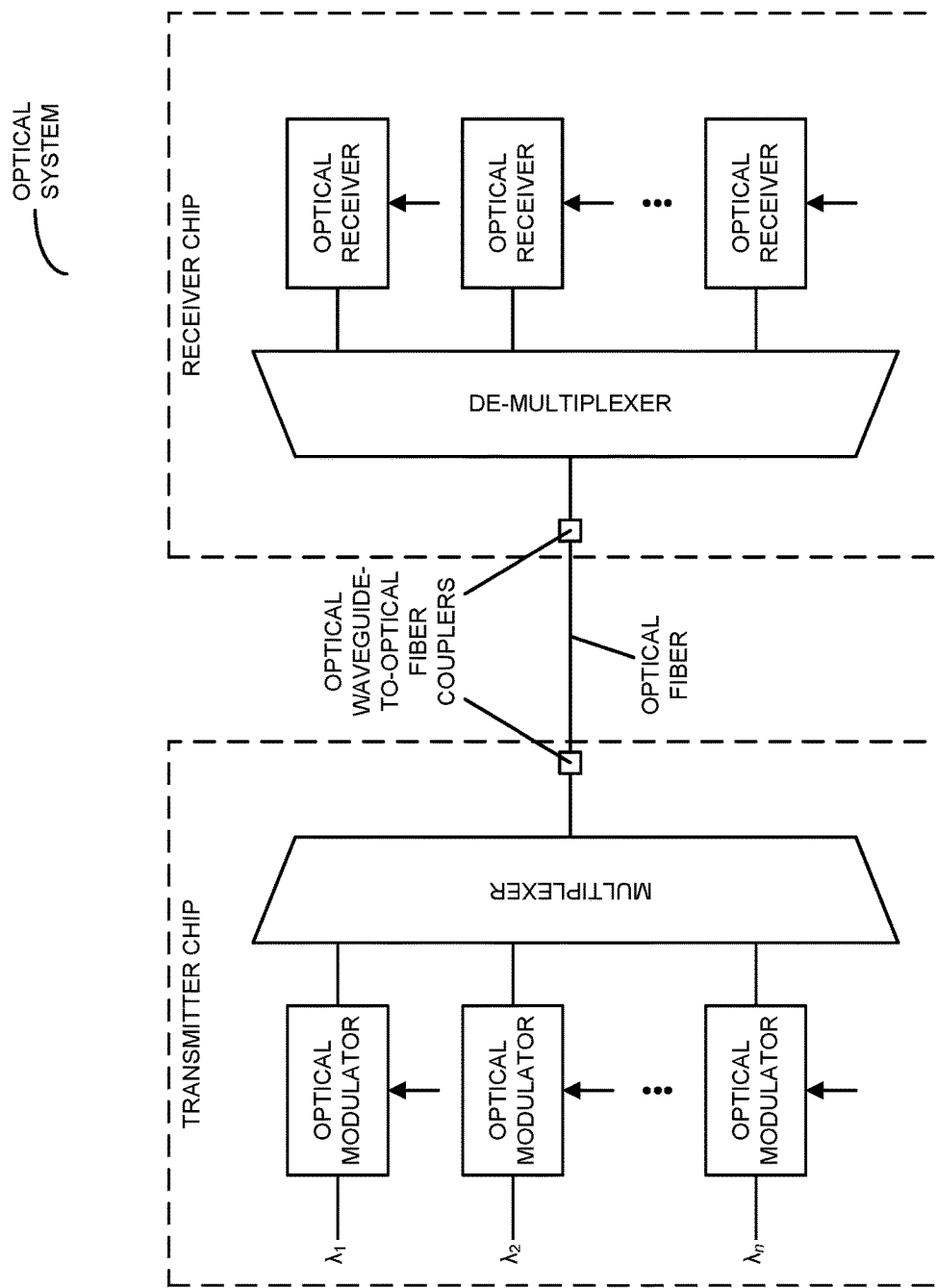
FIG. 1 is a block diagram illustrating an existing optical system.

Table 1 provides design parameters for an echelle grating in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of an optical receiver, a system that includes the optical receiver, and a method for providing output optical signals are described. Using silicon-photonic components that support a single polarization, the output of this optical receiver is independent of the polarization of an optical signal. In particular, using a polarization-diversity technique, the two orthogonal polarizations in a single-mode optical fiber are split in two and processed independently. For example, the two optical signals may be provided by a polarization-splitting grating coupler. Subsequently, a redistribution element provide mixtures of the two optical signals. Next, a wavelength channel in the two mixed optical signals is selected using a wavelength-selective filter (for example, using ring-resonator drop filters or an echelle grating) and converted into an electrical signal at an optical detector (such as a photodetector) to achieve polarization-independent operation.

By providing polarization-independent operation, the optical receiver may allow low-cost single-mode optical fibers and low-cost silicon-photonic components to be used in optical interconnects. Moreover, the polarization independence may facilitate the use of wavelength division multiplexing (WDM) in the optical interconnects, thereby significantly improving the performance of the optical interconnects (such as the bandwidth density and the power consumption) and computing systems that include the optical interconnects. Consequently, the polarization-independent optical receiver may facilitate high-speed inter- and intra-chip silicon-photonic interconnects, as well as associated systems that can include this component (such as high-performance computing systems).

We now describe embodiments of the optical receiver. While single-mode optical fibers (SMFs) are low-cost optical fibers that can be used in high-performance WDM optical communication, a silicon-photonic WDM link over SMF remains a challenge because of the fluctuating state-of-polarization of the incoming light and the high polarization-selectivity of the thin (sub-micron-thick) silicon-on-insulator (SOI) optical waveguides. Consequently, a polarization-insensitive silicon-photonic high-speed optical receiver that overcomes these limitations would be useful.

One approach to implementing a polarization-independent silicon-photonic WDM optical receiver with silicon-photonic components uses a polarization-diversity technique. In particular, the two orthogonal polarizations in an SMF are split into two optical paths that are processed independently and combined at a photodetector to achieve polarization-independent operation.

For example, diffraction-grating couplers (which are sometimes referred to as 'grating couplers') can be designed to couple light between an SMF and a silicon optical waveguide. In particular, specially designed one-dimensional or two-dimensional grating structures can work as an optical coupler and as a polarization splitter that equally separates the two orthogonal polarization components in the SMF into two different silicon optical waveguides. The transverse-electric (TE) mode may be output from the grating coupler through one of its outputs. Moreover, the transverse-magnetic (TM) mode may be projected into a second TE mode and may output from the grating coupler through a second output. The power in each of the output optical waveguides of the polarization-splitting coupler may be dependent on the state of polarization of the incoming beam. However, the sum of the powers in both the output optical waveguides may be essentially constant. Consequently, a polarization-independent silicon-photonic WDM optical receiver using the polarization-diversity technique may be based on a so-called 'polarization-splitting grating coupler' (PSGC).

Figure 2:
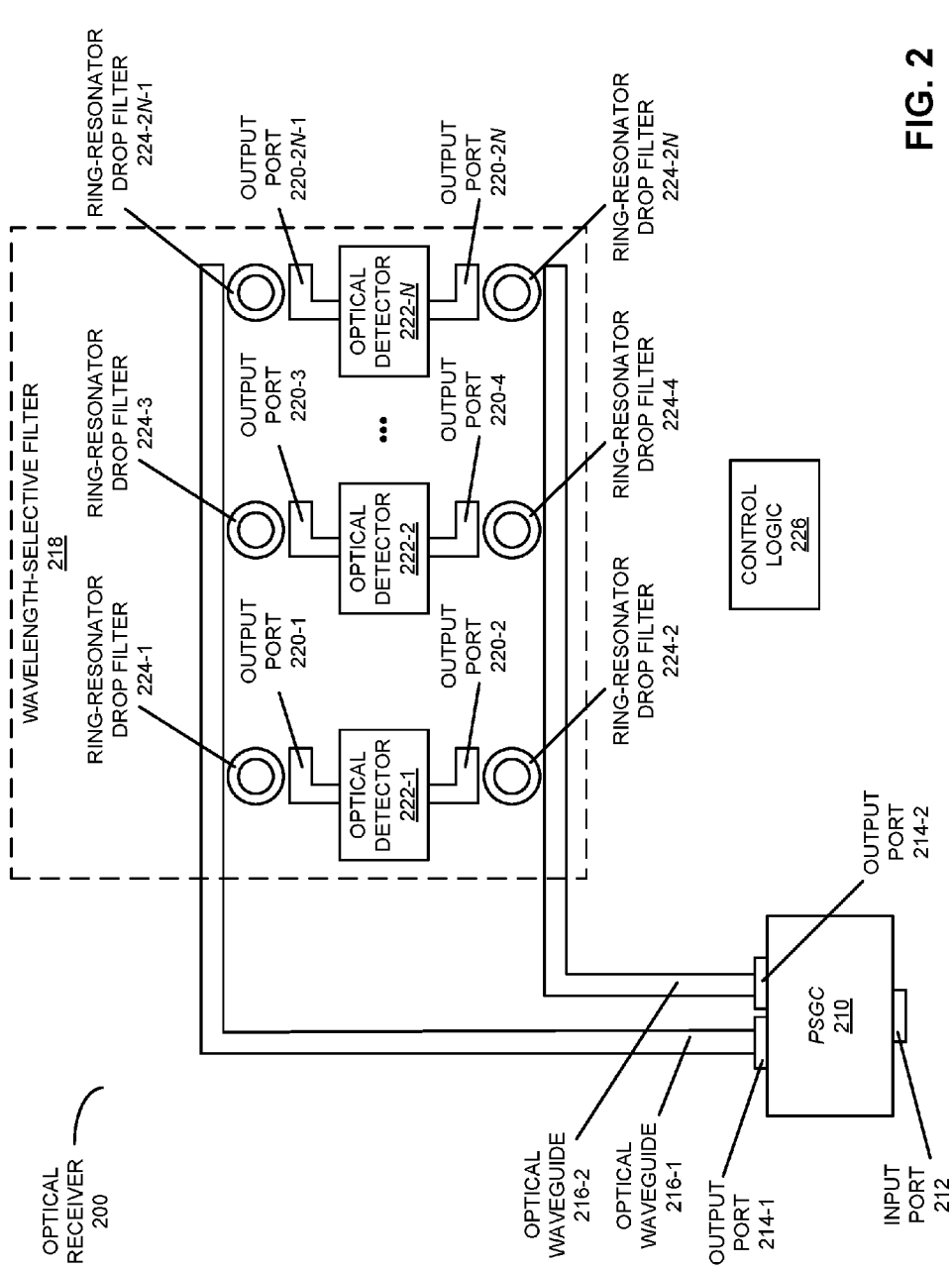
FIG. 2 is a block diagram illustrating a polarization-independent optical receiver in accordance with an embodiment of the present disclosure.

An illustration of this polarization-independent optical receiver is shown in FIG. 2. In particular, the two orthogonal polarization components of the WDM optical signal (which may include multiple wavelengths) in an optical fiber, P1 and P2, which are received on an input port 212 of PSGC 210 from an optical fiber or an input optical waveguide (not shown), may be separated and output at output ports 214 into two optical waveguides 216 on the receiver chip. Then, ring-resonator-based wavelength drop filters 224 (and, more generally, de-multiplexer components) in wavelength-selective filter 218 may be used to separate the wavelengths or wavelength channels (such as wavelengths $\lambda_1$ through $\lambda_n$) for these two polarization components simultaneously. The outputs on a pair of output ports 220 from a pair of ring-resonator drop filters that are tuned to the (same) given one of the wavelengths may be optically coupled to two input ports of one of optical detectors 222 (such as a germanium optical waveguide photodetector), which may analog combine and convert the incoming optical signals on the two input ports into an electrical signal. For clarity, the incoming optical signals to the corresponding incoming input ports of optical detectors 222 may have the same polarization (in this case TE, although a TM-optical waveguide version may also be designed), but have a random, variable power ratio that depends only on the state-of-polarization of the incoming light to PSGC 210. Note that while the power in each of optical waveguides 216 is dependent on the state of polarization of the input optical signal, the sum of powers in both optical waveguides 216 is essentially constant (and, thus, independent of the polarization of the input optical signal).

In principle, with careful optical waveguide routing that ensures that the optical waveguides before and after ring-resonator drop filters 224 are equal in length, and by using ring-resonator drop filters having the same size and optical coupling condition, the two polarization components may arrive at one of optical detectors 222 simultaneously. Note that the sum of the optical signals at the one of optical detectors 222 may then be independent of the polarization state in the optical fiber.

However, in practice the two ring-resonator filters in a given pair are usually not perfectly identical or symmetric (this is likely to be the case the further apart the ring-resonator drop filters are from each other). Consequently, the two polarization components, P1 and P2, may experience different optical signal loss and latency before they combine at the one of optical detectors 222 and current-sum electrically. Moreover, the tuning and control of ring-resonator drop filters 224 (which may be performed by control logic 226, which may include electrical circuits) are often time-dependent on the optical signal power before and after the ring-resonator drop filters 224 (e.g., in an intensity-based locking technique). Therefore, the unknown state of the polarization in the incoming optical fiber, as well as imperfections in the optical fiber, stress-induced birefringence from bending and vibration, and thermal fluctuation in the path of the optical fiber, often results in an uncertain and changing optical power level in the two optical paths, which may make the tuning and control of the silicon ring-resonator drop filters 224 extremely challenging.

For example, if the incident polarization state is aligned with one of the linear polarization axes of the PSGC, one of the two paths of the receiver does not receive any light (i.e., there may be zero power in one optical path) and the tuning technique may lose its tracking signal, which may result in a loss of tuning lock. Subsequently, when the polarization state changes, reintroducing light into the now-unlocked ring resonator, the optical receiver performance may suffer because of the polarization-dependent optical loss caused by the unlocked ring resonator.

In addition, the loss of the tracking signal may cause the corresponding ring resonator to drift as the local temperature changes. In particular, while most WDM de-multiplexer components are sensitive to temperature fluctuations to a certain degree, a silicon ring-resonator-based de-multiplexer (which may be preferred because of its compact footprint) typically suffers from its high sensitivity to temperature fluctuations. Consequently, thermal stabilization of the ring resonator via a feedback loop is typically critical for its proper operation, but, by principle, a feedback loop usually requires an error signal in order to operate properly.

Thus, for certain input polarization states, optical receiver 200 may result in unstable or indeterminate behavior.

These challenges may be addressed by maintaining light in both of the optical paths in the optical receiver. Moreover, two $n^{th}$-order ring-resonator de-multiplexers in the optical receiver may be locked using a shared optical detector, so that the optical receiver can remain locked under all practical input polarization states.

Figure 3:
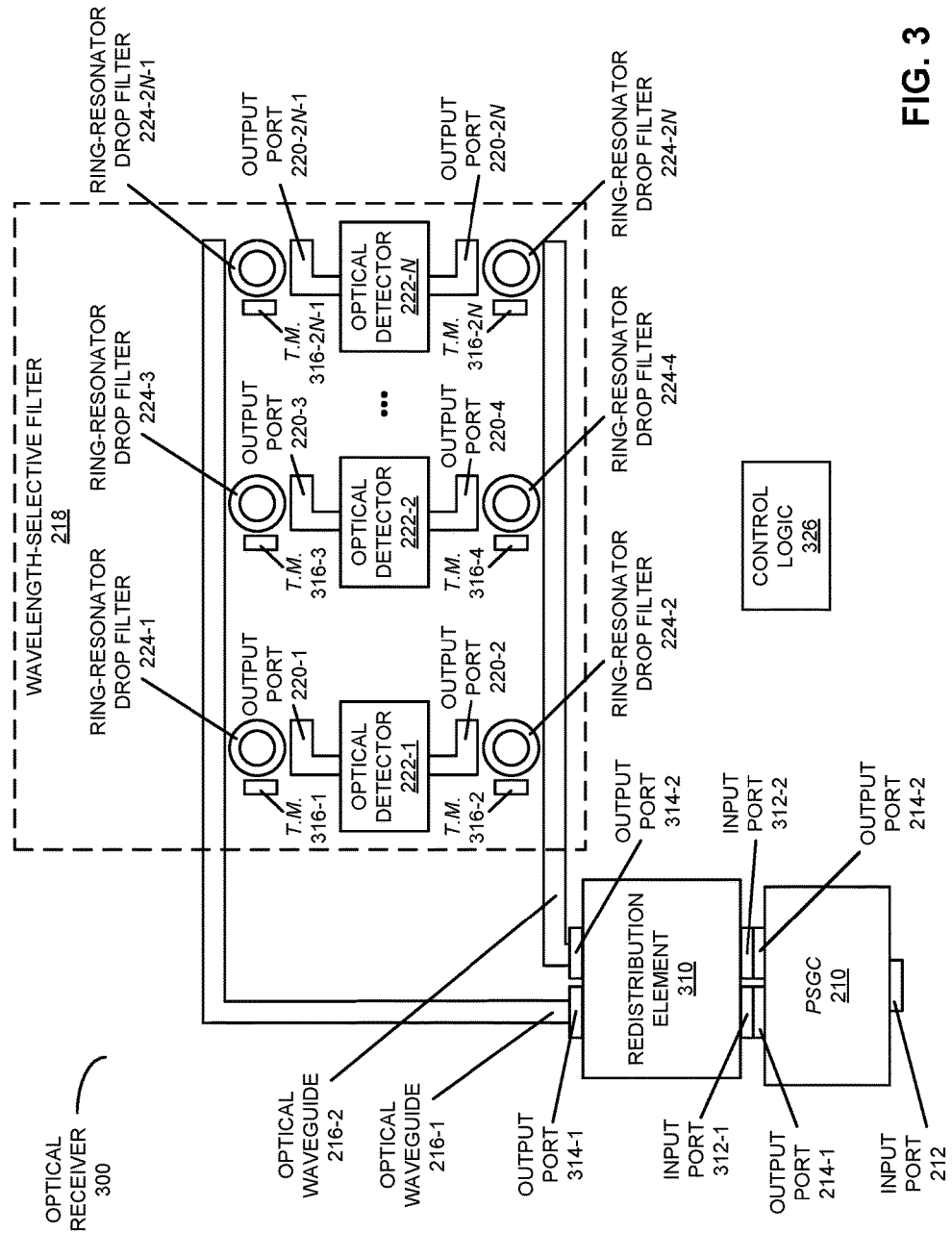
FIG. 3 is a block diagram illustrating a polarization-independent optical receiver in accordance with an embodiment of the present disclosure.

In particular, as shown in FIG. 3, which presents a block diagram illustrating an optical receiver 300, the light in the two arms or optical paths can be redistributed using redistribution element 310 in order to ensure presence of light in both arms at all times.

Note that redistribution element 310 may have low insertion loss and may operate over sufficient optical bandwidth to cover the desired WDM channels. For example, redistribution element 310 may be: a directional coupler, and/or a multi-mode interferometer. A directional coupler is typically a 4-port device, which redistributes light at one of two input ports 312 to two output ports 314 according to the designed splitting ratio. (Thus, output ports 314 provide mixtures of the optical signals on input ports 312.) The optimum splitting ratio is 50:50, such that the two output ports will maintain constant amplitude irrespective of the incident polarization state, if the light or optical signals in the two arms are incoherent.

However, if the light in the two arms is partially coherent (which is likely because it is produced by the same laser source), the optical signals may interfere. The visibility of this interference may be determined by the degree of coherence of the guided light in the two arms, and this interference can cause the optical power in the two arms to deviate from the designed splitting ratio. In spite of this interference effect, optical receiver 300 may represent a substantial improvement over optical receiver 200 (FIG. 2). Even in a hypothetical worst-case scenario in which the two arms are perfectly coherent, the addition of redistribution element 310 adds a phase condition for light in one arm to be completely extinguished. In particular, optical receiver 200 (FIG. 2) only required alignment of the polarization state in order to lose resonance lock. In contrast, in optical receiver 300, in addition to the alignment of the polarization state (so that the two arms have equal intensity in the case of 50:50 coupling in redistribution element 310), phases of the two polarization states must be aligned for destructive interference. Alignment of both the phase and the polarization state over a sufficient period of time to cause loss of resonance locking in one arm is significantly less likely than alignment of polarization state alone, improving the reliability of the WDM de-multiplexer locking and, thus, the reliability of optical receiver 300.

In some embodiments, the photocurrent from a given optical detector is directed to a transimpedance amplifier (TIA) to provide the best optical receiver sensitivity. In addition, tapping off a feedback signal used to lock a given ring resonator may not load down the receiver-amplifier chain. For example, a low-frequency feedback signal may be designed to be out-of-band of the received data and may be tapped off from the amplified voltage signal produced by either the TIA or a post amplifier, as opposed to directly from the optical detector photocurrent.

The approach for providing polarization diversity illustrated in FIG. 3 can be generalized to other optical devices. In particular, a polarization-independent optical receiver can be implemented by placing corresponding identical, symmetric, WDM de-multiplexer optical components in both output arms of PSGC 210 and then optically combining each pair of respective wavelength-de-multiplexed outputs of the corresponding WDM de-multiplexers into a corresponding set of optical detectors 222.

Figure 4:
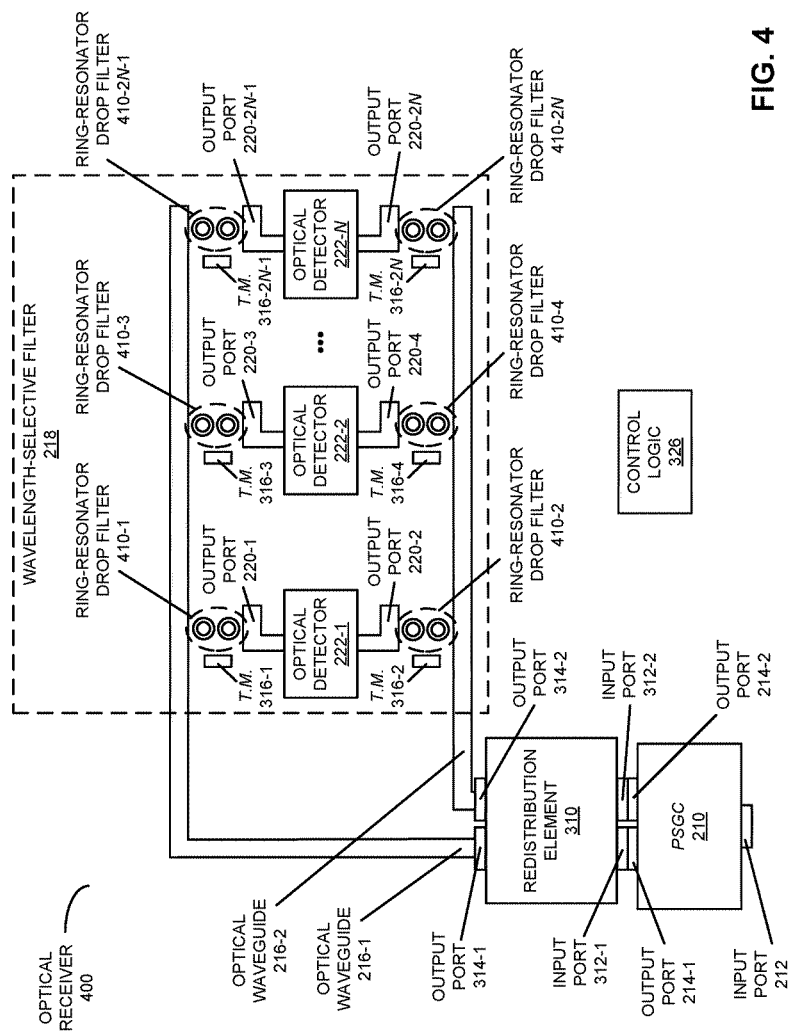
FIG. 4 is a block diagram illustrating a polarization-independent optical receiver in accordance with an embodiment of the present disclosure.

For example, as shown in FIG. 4, which presents a block diagram illustrating an optical receiver 400, higher-order ring-resonator drop filters with a better notch may be used, such as $2^{nd}$-order ring-resonator drop filters 410. In particular, pairs of ring resonators may be used in each of ring-resonator drop filters 410. As described further below, control logic 326 may lock a given first pair of ring-resonator drop filters (such as ring-resonator drop filter 410-1) to a first wavelength conveyed on optical waveguide 216-1 and a given second pair of ring-resonator drop filters (ring-resonator drop filter 410-2) to a second wavelength (which may be the same or different than the first wavelength) conveyed on optical waveguide 216-2 by: applying a dithering electrical signal to a thermal-tuning mechanism or T.M. (such as thermal-tuning mechanism 316-1 and/or 316-2) that is thermally coupled to a given pair of ring-resonator drop filters in ring-resonator drop filter 410-1 and ring-resonator drop filter 410-2 in order to thermally modulate the resonance wavelengths of each of the ring-resonator drop filters in the given pair so as to create a dithered (and, more generally, a modulated) optical signal associated with each of the ring-resonator drop filters in the give pair that is detected and used to lock the given pair to its corresponding wavelength. For example, control logic 326 may: measure or detect the dithered optical signal (e.g., using a separate monitor optical detector (such as optical detector 222-1) that is associated with the given pair or at least one of the ring-resonator drop filters in the given pair); use the measurements to produce an error signal (which is independent of other error signals in optical receiver 400); and may adjust the dithered electrical signal (i.e., a power) applied to thermal-tuning mechanism 316-1 and/or 316-2. Note that control logic 326 may, simultaneously and independently, perform these operations with the other given pair of ring-resonator drop filters in ring-resonator drop filter 410-1 and ring-resonator drop filter 410-2 to lock it to its corresponding wavelength.

Figure 5:
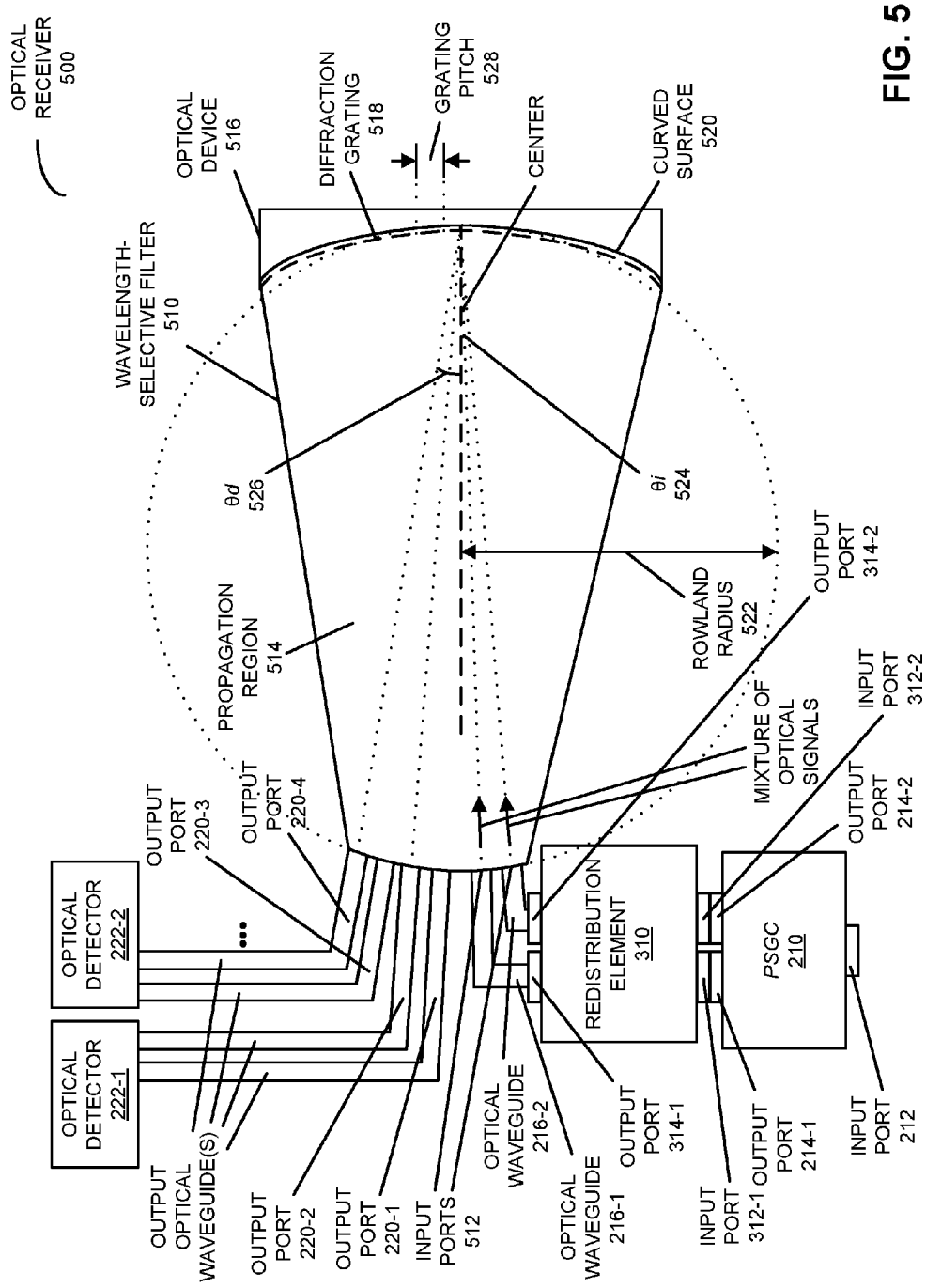
FIG. 5 is a block diagram illustrating a polarization-independent optical receiver in accordance with an embodiment of the present disclosure.

Alternatively, instead of ring-resonator drop filters, a de-multiplexing optical device may include a diffraction grating on a curved surface, such as an echelle grating. This is shown in FIG. 5, which presents a block diagram illustrating an optical receiver 500. In particular, wavelength-selective filter 510 may include: input ports 512 that couple to optical waveguides 216; a propagation region 514 that conveys a mixture of the first optical signal and the second optical signal; an optical device 516 that images and diffracts the mixture of the first optical signal and the second optical signal using a reflective geometry; and output ports 220, optically coupled to diffraction orders of optical device 516, which provide the output optical signals having the wavelengths in the optical signals.

For example, optical device 516 may include a diffraction grating 518 on a curved surface 520 having a radius of twice Rowland radius 522, such as an echelle grating. Thus, an incidence angle ($\theta_i$) 524 associated with a diffraction order may be different than a diffraction angle ($\theta_d$) 526 associated with the diffraction order. Note that grating pitch 528 of diffraction grating 518 may be greater than or equal to 20 μm and/or Rowland radius 522 may be less than 1 mm.

In this way, optical device 516 may de-multiplex the wavelength channels in the first optical signal and the second optical signal, and provide the wavelength channels on output ports 220. The wavelength channels have the same spacing on output ports 220 as in the input optical signal but are separated in space. For example, wavelength (or wavelength channel) $\lambda_1$ on input ports 512 may be output on output ports 220-1 and 220-2. Similarly, wavelength (or wavelength channel) $\lambda_2$ on input ports 512 may be output on output ports 220-3 and 220-4. Each pair of output ports (such as output ports 220-1 and 220-2) may be coupled to a corresponding optical detector (such as optical detector 222-1) where the output optical signals are combined electrically with a magnitude proportional to the sum of the optical power in the pair of output ports. With careful routing of the optical waveguides before and after wavelength-selective filter 510 to ensure that the optical paths for the two orthogonal polarization components have the same length, the two orthogonal polarization components will arrive at the given optical detector simultaneously because their optical paths share the same diffraction grating 518, and because the imaging provided by the echelle grating ensures that optical path length for each pair of output optical signals is identical. Moreover, redistribution element 310 may ensure that each optical path has light regardless of the polarization state of the incident optical signal. Therefore, regardless of the polarization state of the input optical signal, optical detectors 222 will convert the output optical signals from output ports 220 into stable electrical output signals (i.e., optical receiver 500 is polarization independent).

Figure 6:
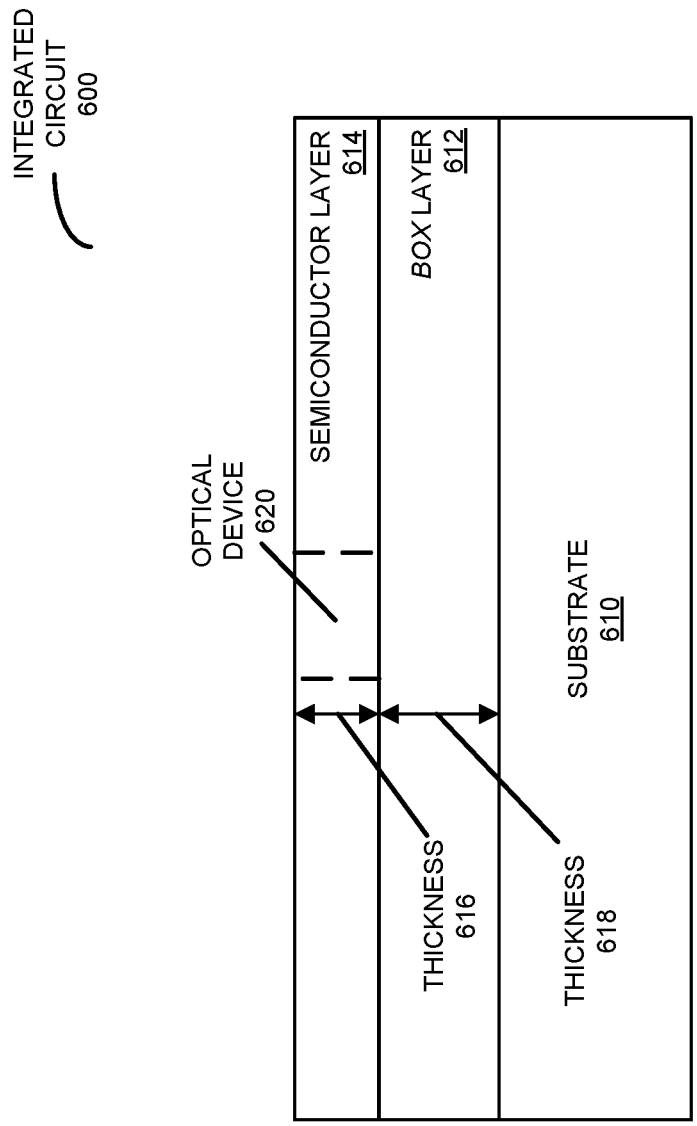
FIG. 6 is a block diagram illustrating a side view of an integrated circuit that includes a polarization-insensitive optical receiver in accordance with an embodiment of the present disclosure.

In an exemplary embodiment, the optical receiver may be implemented using silicon-on-insulator (SOI) technology. This is illustrated in FIG. 6, which presents a block diagram illustrating a side view of an integrated circuit 600 that includes an embodiment of the optical receiver. In particular, integrated circuit 600 may include: a substrate 610; a buried-oxide layer 612 disposed on substrate 610; and a semiconductor layer 614 disposed on buried-oxide layer 612. As illustrated by optical device 620, at least the optical waveguides and/or the wavelength-selective filter may be included in semiconductor layer 614. Note that substrate 610 and/or semiconductor layer 614 may include a semiconductor, such as silicon.

In an exemplary embodiment, the input optical signal has wavelengths between 1.1-1.7 μm, such as an optical signal having a fundamental wavelength of 1.3 or 1.55 μm. Moreover, semiconductor layer 614 may have a thickness 616 that is less than 1 μm (such as 0.25-0.3 μm). Furthermore, buried-oxide layer 612 may have a thickness 618 between 0.3 and 3 μm (such as 0.8 μm). Note that a radius of a given ring resonator may be between 1.5-60 μm.

Furthermore, the parameters for an exemplary design of an echelle grating are provided in Table 1.

TABLE 1

| | |
|---|---|
| Channel count | 8 |
| Channel spacing (nm) | 1.6 |
| Optical crosstalk (dB) | 20-25 |
| Footprint (μm²) | 500 × 200 |
| Insertion loss | <3 dB |
| Carrier wavelength (nm) | 1550 |
| Free spectral range (nm) | 12.8 |
| Thickness 416 (nm) | 300 |
| Diffraction order | 90 |
| Grating pitch 326 (μm) | 25 |

We now describe a locking technique for locking the pair of $n^{th}$-order ring-resonator de-multiplexers based on the availability of feedback signals from the two arms using a shared optical detector in optical receiver 400 (FIG. 4). In particular, the locking technique may be based on dithering or a binary 'bang-bang' control technique, which may be implemented using control logic 326 (FIGS. 3 and 4). The dithering-based approach may apply an out-of-band signal to the ring-resonator de-multiplexer in order to generate an error signal. This modulated dither signal (such as a sine wave or a square wave) can be mixed down to baseband using a homodyne technique to generate an error signal. This approach can be extended to two de-multiplexer elements based on ring resonators sharing a common optical detector (in the case of the polarization-splitting optical receiver) by applying dither signals of different frequencies so the error signal associated with a particular pair of ring resonators can be identified. The error signals are in essence multiplexed in the frequency domain because of the different dithering frequencies (which allows feedback control of multiple ring resonators at the same time), and therefore can be down-converted independently of the other dither signals. This allows continuous locking of the ring resonators by implementing a control loop, such as a proportional-integral-derivative loop. Because of the frequency-multiplexing in this approach, the locking technique can be scaled to $n^{th}$-order ring-resonator de-multiplexer pairs by applying discrete dithering frequencies to each of the ring resonators to be locked, and implementing independent control loops for each of the ring resonators.

Alternatively, the 'bang-bang' control technique can be used to lock the ring resonators. As an illustrative example, consider the case where n equals 1 (i.e., a first-order ring-resonator de-multiplexer consisting of a single ring resonator). A bang-bang controller is a discrete-time system that either increases or decreases the control signal (e.g., heater power) based on a binary comparison between the current measured signal and a threshold. This control technique may be near-optimal from a control-efficiency perspective. Note that the threshold can be a fixed value that is determined during start-up, or it can be continuously updated on every time-step for more robust operation.

An example loop implementing the threshold-update approach may acquire a baseline feedback signal (such as the shared photocurrent). Then, an increment to the control signal may be acquired for a first de-multiplexer (such as the heater power, voltage and/or current), which is optically coupled to the first optical waveguide, with the same polarity as the previous loop operation.

Moreover, after waiting for the ring resonator to settle in to a new state (over a time that includes several thermal time constants), a new feedback signal (such as the shared photocurrent) may be acquired. This new feedback signal may be compared to the baseline or a threshold value to determine a polarity of an error signal. Then, based on a sign of the error signal, a sign of an amount of an increment applied to the thermal-tuning mechanism that is thermally coupled to the given pair of ring-resonator drop filters may be reversed.

Thus, if the new feedback signal is larger than the baseline, then the polarity of the increment for the first ring resonator may be maintained. If not, the polarity of the increment may be reversed. For example, based on a sign of the error signal, a sign of an increment applied to a thermal-tuning mechanism that is thermally coupled to the first ring resonator may be reversed. In an exemplary embodiment, the control logic may reverse the polarity of the applied change to the thermal-tuning mechanism. For example, if a current electrical signal applied to the thermal-tuning mechanism is '100' and if the current optical signal is greater than the threshold value, the increment may be '+1,' so that the electrical signal is '101.' Alternatively, if the current optical signal is less than the threshold, then polarity of the change is negated to '−1,' so new electrical signal may be updated to '99.'

Furthermore, the aforementioned operations may be repeated for the second ring resonator de-multiplexer, which is optically coupled to the first optical waveguide.

Next, the loop may repeat from the beginning.

Thus, the bang-bang control technique may be applied to multiple ring resonators sharing an optical detector by using time-division multiplexing. This approach may be extended for an $n^{th}$-order ring-resonator de-multiplexer element by either implementing the operations in the loop for all 2·n ring resonators sequentially, or alternating between de-multiplexer 1 and de-multiplexer 2. For example, for the case of n equals two, the operations in the loop may be applied by alternating between de-multiplexer 1 and de-multiplexer 2 (such as de-multiplexer 1: ring resonator 1, de-multiplexer 2: ring resonator 1, de-multiplexer 1: ring resonator 2, and de-multiplexer 2: ring resonator 2) or sequentially (such as de-multiplexer 1: ring resonator 1, de-multiplexer 1: ring resonator 2, de-multiplexer 2: ring resonator 1, and de-multiplexer 2: ring resonator 2).

Note that, in some embodiments, one or more of the optical detectors are shared by different output ports in the wavelength-selective filter using time-division multiplexing. In particular, in these embodiments, an optical detector is used by ring-resonator drop filters 224-1 and 224-2 in FIG. 2 during a first time interval, the optical detector is used by ring-resonator drop filters 224-3 and 224-4 in FIG. 2 during a second, subsequent time interval, etc. Thus, the optical detector can be shared in time for locking of ring-resonator drop filters 224-1 and 224-2 (i.e., locking 224-1 by detecting using optical detector 222-1), then in next time interval, ring-resonator drop filters 224-2 are locked using optical detector 222-1, etc.

The combination of the optical receiver having the improved availability of the ring-resonator error signal and the technique for locking multiple ring resonators using a shared optical detector may provide robust operation of a polarization-splitting WDM optical receiver using minimum number of photodetectors.

Figure 7:
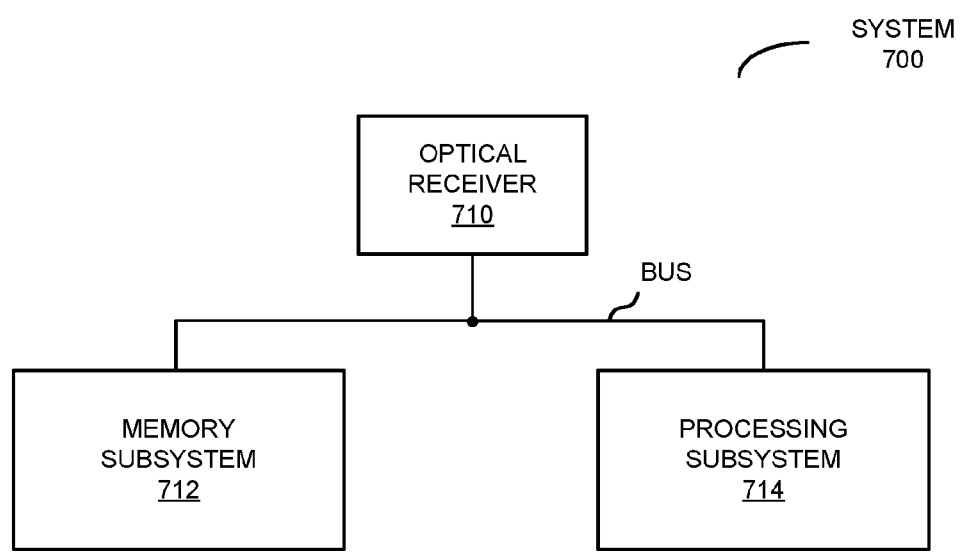
FIG. 7 is a block diagram illustrating a system that includes a polarization-insensitive optical receiver in accordance with an embodiment of the present disclosure.

One or more of the preceding embodiments of the optical receiver may be included in a system and/or an electronic device. This is shown in FIG. 7, which presents a block diagram illustrating a system 700 that includes optical receiver 710, such as one of the preceding embodiments of the optical receiver. In some embodiments, system 700 includes processing subsystem 712 (with one or more processors) and memory subsystem 714 (with memory).

In general, functions of optical receiver 710 and system 700 may be implemented in hardware and/or in software. Thus, system 700 may include one or more program modules or sets of instructions stored in a memory subsystem 714 (such as DRAM or another type of volatile or non-volatile computer-readable memory), which, during operation, may be executed by a processing subsystem 712. Note that the one or more computer programs may constitute a computer-program mechanism. Furthermore, instructions in the various modules in memory subsystem 714 may be implemented in: a high-level procedural language, an object-oriented programming language, and/or in an assembly or machine language. Note that the programming language may be compiled or interpreted, e.g., configurable or configured, to be executed by the processing subsystem.

Components in system 700 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 700 may be at one location or may be distributed over multiple, geographically dispersed locations.

System 700 may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

Moreover, optical receiver 710 can be used in a wide variety of applications, such as: communications (for example, in a transceiver, an optical interconnect or an optical link, such as for intra-chip or inter-chip communication), a radio-frequency filter, a bio-sensor, data storage (such as an optical-storage device or system), medicine (such as a diagnostic technique or surgery), a barcode scanner, metrology (such as precision measurements of distance), manufacturing (cutting or welding), a lithographic process, data storage (such as an optical-storage device or system) and/or entertainment (a laser light show).

Furthermore, the embodiments of optical receiver 710 and/or system 700 may include fewer components or additional components. For example, the semiconductor substrate may be one of multiple substrates in a multi-chip module (such as a multi-chip module in which alternating facing chips that include routing and bridge layers are coupled using optical proximity communication). Furthermore, a wide variety of fabrication techniques may be used to fabricate the optical receiver in the preceding embodiments of the optical receiver, as is known to one of skill in the art. In addition, a wide variety of optical components may be used in or in conjunction with the optical receiver.

Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the optical receiver, optical receiver 710 and/or system 700 may be implemented more in hardware and less in software, or less in hardware and more in software, as is known in the art.

While the preceding embodiments have been illustrated with particular elements and compounds, a wide variety of materials and compositions (including stoichiometric and non-stoichiometric compositions) may be used, as is known to one of skill in the art. Thus, while a silicon optical waveguide was illustrated in the preceding embodiments, the communication technique may be used with other materials (such as germanium and/or silicon germanium), as is known to one of skill in the art. Moreover, the semiconductor layer may include polysilicon or amorphous silicon. Furthermore, the materials and compounds in optical receiver 710 may be fabricated using a wide variety of processing techniques, including: evaporation, sputtering, chemical vapor deposition, molecular-beam epitaxy, wet or dry etching (such as photolithography or direct-write lithography), polishing, etc. In addition, a wide variety of optical components may be used in or in conjunction with optical receiver 710.

Figure 8:
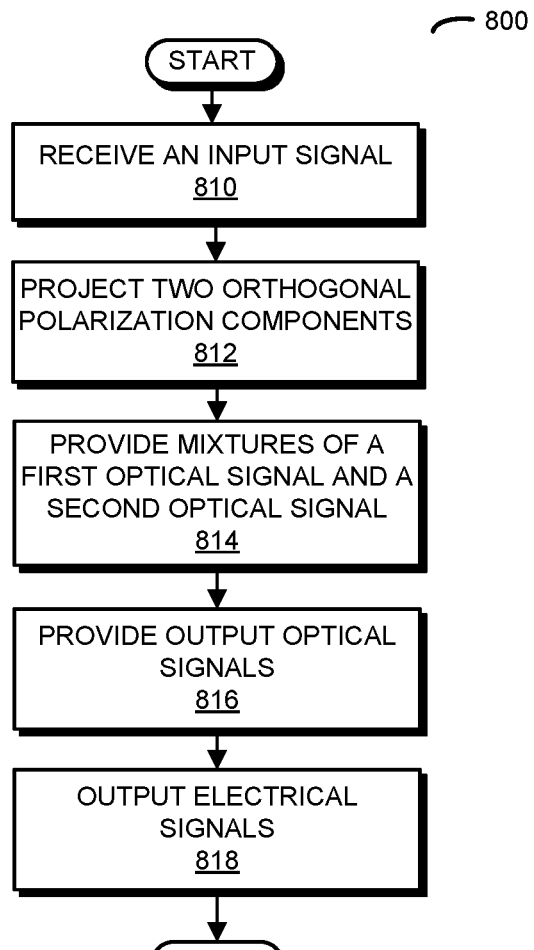
FIG. 8 is a flow chart illustrating a method for providing output optical signals in accordance with an embodiment of the present disclosure.

We now describe embodiments of a method for tuning an optical receiver. FIG. 8 presents a flow chart illustrating a method 800 for providing output optical signals using an optical receiver, such as one of the preceding embodiments of the optical receiver. During operation, the optical receiver receives an input optical signal (operation 810) having two orthogonal polarization components and multiple wavelengths. Then, a PSGC in the optical receiver projects the two orthogonal polarization components (operation 812) into a first optical signal having a type of transverse mode and a second optical signal having a second type of transverse mode (e.g., by projecting a portion of the input optical signal having the TM mode into a second TE mode).

Moreover, a redistribution element in the optical receiver provides mixtures of the first optical signal and the second optical signal (operation 814). Next, a wavelength-selective filter in the optical receiver provides output optical signals (operation 816) having the wavelengths in the first optical signal and the second optical signal, where a given output optical signal has a given wavelength in at least one of the first optical signal and the second optical signal. Furthermore, optical detectors in the optical receiver output electrical signals (operation 818) corresponding to the output optical signals, where a given electrical signal corresponds to at least the given output optical signal.

In some embodiments of method 800, there may be additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical receiver, comprising:
a polarization-splitting grating coupler (PSGC) having an input port, a first output port and a second output port, wherein, during operation:
the input port receives an input optical signal having two orthogonal polarization components and multiple wavelengths;
the first output port provides a first optical signal having a type of transverse mode corresponding to one of the two polarization components; and
the second output port provides a second optical signal having the type of transverse mode corresponding to the other of the two polarization components;
a redistribution element, optically coupled to the first output port and the second output port, having a third output port and a fourth output port, wherein, during operation, the third output port and the fourth output ports provide mixtures of the first optical signal and the second optical signal;
a first optical waveguide optically coupled to the third output port;
a second optical waveguide optically coupled to the fourth output port;
a wavelength-selective filter, optically coupled to the first optical waveguide and the second optical waveguide, having output ports that, during operation, provide output optical signals having the wavelengths in the first optical signal and the second optical signal, wherein a given output port provides a given output optical signal having a given wavelength in the first optical signal and the second optical signal, wherein the wavelength-selective filter includes pairs of ring-resonator drop filters optically coupled to the first optical waveguide and the second optical waveguide, and optically coupled to the optical detectors, wherein a first ring-resonator drop filter in a given pair of ring-resonator drop filters includes one of the output ports and, during operation, outputs a first output optical signal having a first wavelength in the first optical signal and the second optical signal, and wherein a second ring-resonator drop filter in the given pair of ring-resonator drop filters includes another of the output ports and, during operation, outputs a second output optical signal having the first wavelength in the first optical signal and the second optical signal; and optical detectors, optically coupled to the wavelength-selective filter, that, during operation, provide electrical signals corresponding to the output optical signals, wherein a given optical detector is optically coupled to at least the given output port and provides a given electrical signal corresponding to at least the given output optical signal.

2. The optical receiver of claim 1, wherein, during operation, the PSGC projects the two orthogonal polarization components into the first optical signal on the first output port having the type of transverse mode and the second optical signal on the second output port having a second type of transverse mode.

3. The optical receiver of claim 1, wherein the redistribution element includes one of: a directional coupler, and a multi-mode interferometer.

4. The optical receiver of claim 1, wherein the given optical detector is optically coupled to the first ring-resonator drop filter and the second ring-resonator drop filter.

5. The optical receiver of claim 1, wherein the wavelength-selective filter includes:
input ports that, during operation, optically couple to the first optical waveguide and the second optical waveguide;
a propagation region that, during operation, conveys the first optical signal and the second optical signal;
an optical device that, during operation, images and diffracts the first optical signal and the second optical signal using a reflective geometry; and
the output ports, optically coupled to diffraction orders of the optical device, that, during operation, provide the output optical signals having the wavelengths in the first optical signal and the second optical signal.

6. The optical receiver of claim 5, wherein an incidence angle associated with a given diffraction order of the optical device is different than a diffraction angle associated with the given diffraction order.

7. The optical receiver of claim 5, wherein the optical device includes a diffraction grating on a curved surface.

8. The optical receiver of claim 5, wherein the optical device includes an echelle grating.

9. The optical receiver of claim 1, further comprising:
a substrate;
a buried-oxide layer disposed on the substrate; and
a semiconductor layer disposed on the buried-oxide layer, wherein the first optical waveguide and the second optical waveguide are included in the semiconductor layer.

10. The optical receiver of claim 9, wherein the substrate includes a semiconductor.

11. The optical receiver of claim 9, wherein the wavelength-selective filter is included in the semiconductor layer.

12. The optical receiver of claim 1, wherein the wavelength-selective filter includes first pairs of ring-resonator drop filters optically coupled to the first optical waveguide, and the optical detectors, and second pairs of ring-resonator drop filters optically coupled to the optical detectors and the second optical waveguide; and
wherein the optical receiver further comprises control logic that, during operation, locks a given first pair of ring-resonator drop filters to a first wavelength on the first optical waveguide and a given second pair of ring-resonator drop filters to the first wavelength on the second optical waveguide by:
applying a dithering electrical signal to a thermal-tuning mechanism that is thermally coupled to a given pair of ring-resonator drop filters in the given first pair of ring-resonator drop filters and the given second pair of ring-resonator drop filters in order to thermally modulate resonance wavelengths of the given pair of ring-resonator drop filters thereby creating a dithered optical signal associated with the given pair of ring-resonator drop filters;
detecting the dithered optical signal using a given optical detector;
determining an error signal based on the dithered optical signal and a threshold value; and
adjusting, based on the error signal, the dithering electrical signal applied to the thermal-tuning mechanism.

13. The optical receiver of claim 1, wherein the wavelength-selective filter includes pairs of ring-resonator drop filters optically coupled to the first optical waveguide and the second optical waveguide, and optically coupled to the optical detectors; and
wherein the optical receiver further comprises control logic that, during operation, locks a given pair of ring-resonator drop filters by:
determining a polarity of an error signal by comparing a given electrical signal output by a given optical detector with a threshold value; and
reversing, based on a sign of the error signal, a sign of an amount of an increment that is applied to a thermal-tuning mechanism that is thermally coupled to the given pair of ring-resonator drop filters.

14. The optical receiver of claim 13, wherein the threshold value is modified after a time interval.

15. The optical receiver of claim 1, wherein one or more of the optical detectors are shared by different output ports in the wavelength-selective filter using time-division multiplexing.

16. A system, comprising:
a processor;
a non-transitory computer-readable medium having computer-readable instructions executable by the processor; and
an optical receiver, wherein the optical receiver includes:
a polarization-splitting grating coupler (PSGC) having an input port, a first output port and a second output port, wherein, during operation:
the input port receives an input optical signal having two orthogonal polarization components and multiple wavelengths;
the first output port provides a first optical signal having a type of transverse mode corresponding to one of the two polarization components; and the second output port provides a second optical signal having the type of transverse mode corresponding to the other of the two polarization components;

a redistribution element, optically coupled to the first output port and the second output port, having a third output port and a fourth output port, wherein, during operation, the third output port and the fourth output ports provide mixtures of the first optical signal and the second optical signal;

a first optical waveguide optically coupled to the third output port;

a second optical waveguide optically coupled to the fourth output port;

a wavelength-selective filter, optically coupled to the first optical waveguide and the second optical waveguide, having output ports that, during operation, provide output optical signals having the wavelengths in the first optical signal and the second optical signal, wherein a given output port provides a given output optical signal having a given wavelength in the first optical signal and the second optical signal, wherein the wavelength-selective filter includes pairs of ring-resonator drop filters optically coupled to the first optical waveguide and the second optical waveguide, and optically coupled to the optical detectors; and optical detectors, optically coupled to the wavelength-selective filter, that, during operation, provide electrical signals corresponding to the output optical signals, wherein a given optical detector is optically coupled to at least the given output port and provides a given electrical signal corresponding to at least the given output optical signal; and a control logic, during operation, locks a given pair of ring-resonator drop filters by:
  determining a polarity of an error signal by comparing a given electrical signal output by a given optical detector with a threshold value; and
  reversing, based on a sign of the error signal, a sign of an amount of an increment that is applied to a thermal-tuning mechanism that is thermally coupled to the given pair of ring-resonator drop filters.

17. The system of claim 16, wherein the wavelength-selective filter includes first pairs of ring-resonator drop filters optically coupled to the first optical waveguide, the second optical waveguide and the optical detectors, and second pairs of ring-resonator drop filters optically coupled to the optical detectors, the first optical waveguide and the second optical waveguide; and wherein the optical receiver further comprises control logic that, during operation, locks the given first pair of ring-resonator drop filters to a first wavelength on the first optical waveguide and the given second pair of ring-resonator drop filters to the first wavelength on the second optical waveguide by:

applying a dithering electrical signal to a thermal-tuning mechanism that is thermally coupled to a given pair of ring-resonator drop filters in the given first pair of ring-resonator drop filters and the given second pair of ring-resonator drop filters in order to thermally modulate resonance wavelengths of the given pair of ring-resonator drop filters thereby creating a dithered optical signal associated with the given pair of ring-resonator drop filters;

detecting the dithered optical signal using a given optical detector;

determining an error signal based on the dithered optical signal and a threshold value; and adjusting, based on the error signal, the dithering electrical signal applied to the thermal-tuning mechanism.

18. A method for providing output optical signals, wherein the method comprises:

receiving an input optical signal having two orthogonal polarization components and multiple wavelengths;

using a PSGC, projecting the two orthogonal polarization components into the first optical signal having a type of transverse mode and the second optical signal having a second type of transverse mode;

using a redistribution element, providing mixtures of the first optical signal and the second optical signal at a first output port and at a second output port of the redistribution element, wherein the first output port is optically coupled to a first optical waveguide, and wherein the second output port is optically coupled to a second optical waveguide;

using a wavelength-selective filter, providing output optical signals having the wavelengths in the first optical signal and the second optical signal, wherein a given output optical signal has a given wavelength in the first optical signal and the second optical signal, wherein the wavelength-selective filter is optically coupled to the first optical waveguide and the second optical waveguide, wherein the wavelength-selective filter includes pairs of ring-resonator drop filters optically coupled to the first optical waveguide and the second optical waveguide, and optically coupled to the optical detectors, wherein a first ring-resonator drop filter in a given pair of ring-resonator drop filters includes one of the output ports and, during operation, outputs a first output optical signal having a first wavelength in the first optical signal and the second optical signal, and wherein a second ring-resonator drop filter in the given pair of ring-resonator drop filters includes another of the output ports and, during operation, outputs a second output optical signal having the first wavelength in the first optical signal and the second optical signal; and using optical detectors, outputting electrical signals corresponding to the output optical signals, wherein a given electrical signal corresponds to at least the given output optical signal.

* * * * *

UNITED STATES PATENT AND TRADEMARK OFFICE
CERTIFICATE OF CORRECTION

PATENT NO. : 9,832,552 B2
APPLICATION NO. : 15/013857
DATED : November 28, 2017
INVENTOR(S) : Lee et al.

It is certified that error appears in the above-identified patent and that said Letters Patent is hereby corrected as shown below:

On the Title Page

Column 2, item [56], under Other Publications, Line 2, delete "Usedas" and insert -- Used as --, therefor.

On page 2, Column 2, item [56], under Other Publications, Line 8, delete "siliconon-insulator" and insert -- silicon-on-insulator --, therefor.

In the Specification

Column 3, Line 63, delete "give" and insert -- given --, therefor.

Column 8, Line 55, delete "give" and insert -- given --, therefor.

Signed and Sealed this
Tenth Day of July, 2018

Andrei Iancu
*Director of the United States Patent and Trademark Office*